US012680271B2

(12) United States Patent
Ikeda et al.

(10) Patent No.: US 12,680,271 B2
(45) Date of Patent: Jul. 14, 2026

(54) CONTROL SYSTEM FOR WORK MACHINE, CONTROL METHOD FOR WORK MACHINE, AND WORK MACHINE

(71) Applicant: KOMATSU LTD., Tokyo (JP)

(72) Inventors: Hiroaki Ikeda, Tokyo (JP); Shinichi Kitao, Tokyo (JP)

(73) Assignee: KOMATSU LTD., Tokyo (JP)

( * ) Notice: Subject to any disclaimer, the term of this patent is extended or adjusted under 35 U.S.C. 154(b) by 217 days.

(21) Appl. No.: 18/256,537

(22) PCT Filed: Feb. 18, 2022

(86) PCT No.: PCT/JP2022/006762
§ 371 (c)(1),
(2) Date: Jun. 8, 2023

(87) PCT Pub. No.: WO2022/176991
PCT Pub. Date: Aug. 25, 2022

(65) Prior Publication Data
US 2024/0026647 A1 Jan. 25, 2024

(30) Foreign Application Priority Data
Feb. 22, 2021 (JP) ................................. 2021-026006

(51) Int. Cl.
*E02F 9/20* (2006.01)
*B60T 7/12* (2006.01)

(52) U.S. Cl.
CPC .............. *E02F 9/2083* (2013.01); *B60T 7/12* (2013.01); *E02F 9/2004* (2013.01); *E02F 9/2025* (2013.01); *E02F 9/2079* (2013.01)

(58) Field of Classification Search
CPC .......... B60T 13/22; B60T 13/385; B60T 7/12; E02F 9/2004; E02F 9/2025; E02F 9/205; E02F 9/2079; E02F 9/2083; E02F 9/226
See application file for complete search history.

(56) References Cited

U.S. PATENT DOCUMENTS

| | | | |
|---|---|---|---|
| 6,287,236 B1 | 9/2001 | Ishikawa | |
| 9,580,890 B2 * | 2/2017 | Nee ......................... | B60T 17/22 |
| 10,144,390 B1 * | 12/2018 | Chaston ................. | G06V 20/56 |
| 10,232,859 B2 * | 3/2019 | Theodosiou .......... | B60W 10/10 |
| 10,710,566 B2 * | 7/2020 | Lucchino ................. | B60T 8/17 |
| 10,994,736 B2 * | 5/2021 | Park ................... | B60W 10/196 |
| 11,795,660 B2 * | 10/2023 | Kondo ................. | E02F 9/2228 |
| 2004/0149462 A1 * | 8/2004 | Okamoto ............... | B62D 55/12 |
| | | | 172/292 |
| 2010/0016123 A1 * | 1/2010 | Kodaka .................... | B60T 8/00 |
| | | | 477/186 |

(Continued)

FOREIGN PATENT DOCUMENTS

| | | |
|---|---|---|
| JP | 2000-309256 A | 11/2000 |
| JP | 2014-94716 A | 5/2014 |

(Continued)

*Primary Examiner* — Tyler J Lee
(74) *Attorney, Agent, or Firm* — Spencer Fane LLP

(57) ABSTRACT

A control system for a work machine includes a controller. The work machine includes work equipment, a traveling device, and a parking brake. The controller is configured to output a control command to control the parking brake based on at least an operation state of the work equipment.

19 Claims, 5 Drawing Sheets

(56) References Cited

U.S. PATENT DOCUMENTS

| | | | | |
|---|---|---|---|---|
| 2011/0300992 A1* | 12/2011 | Richter | ................ | B60T 13/686 |
| | | | | 477/186 |
| 2014/0222300 A1* | 8/2014 | Kakela | ................... | E02F 9/226 |
| | | | | 701/50 |
| 2014/0222304 A1* | 8/2014 | Dix | .................... | B60W 30/186 |
| | | | | 701/60 |
| 2014/0323268 A1* | 10/2014 | Ishikawa | ................ | F16H 39/00 |
| | | | | 477/52 |
| 2014/0367187 A1 | 12/2014 | Kodaka et al. | | |
| 2016/0130788 A1* | 5/2016 | Nee | ....................... | B60T 13/662 |
| | | | | 701/50 |
| 2016/0201295 A1 | 7/2016 | Kishimoto et al. | | |
| 2018/0065629 A1* | 3/2018 | Wolff | .............. | B60W 30/18009 |
| 2018/0304874 A1* | 10/2018 | Lucchino | ............... | B60T 13/22 |
| 2018/0334136 A1* | 11/2018 | Chaston | .................. | G06V 20/56 |
| 2018/0334979 A1* | 11/2018 | Watson | .............. | F02N 11/0807 |
| 2019/0168776 A1* | 6/2019 | Imaizumi | .............. | G06V 20/58 |
| 2019/0315356 A1* | 10/2019 | Park | ................... | B60W 10/184 |
| 2020/0299923 A1* | 9/2020 | Enomoto | ............... | F16D 25/00 |
| 2022/0022361 A1* | 1/2022 | Ogura | ................. | A01B 69/008 |
| 2022/0282453 A1* | 9/2022 | Kondo | ................. | E02F 9/2203 |

FOREIGN PATENT DOCUMENTS

| | | |
|---|---|---|
| JP | 5705755 B2 | 3/2015 |
| JP | 2015-140919 A | 8/2015 |
| JP | 5973326 B2 | 7/2016 |
| JP | 2018-44381 A | 3/2018 |
| JP | 2018-123467 A | 8/2018 |

* cited by examiner

FIG. 3

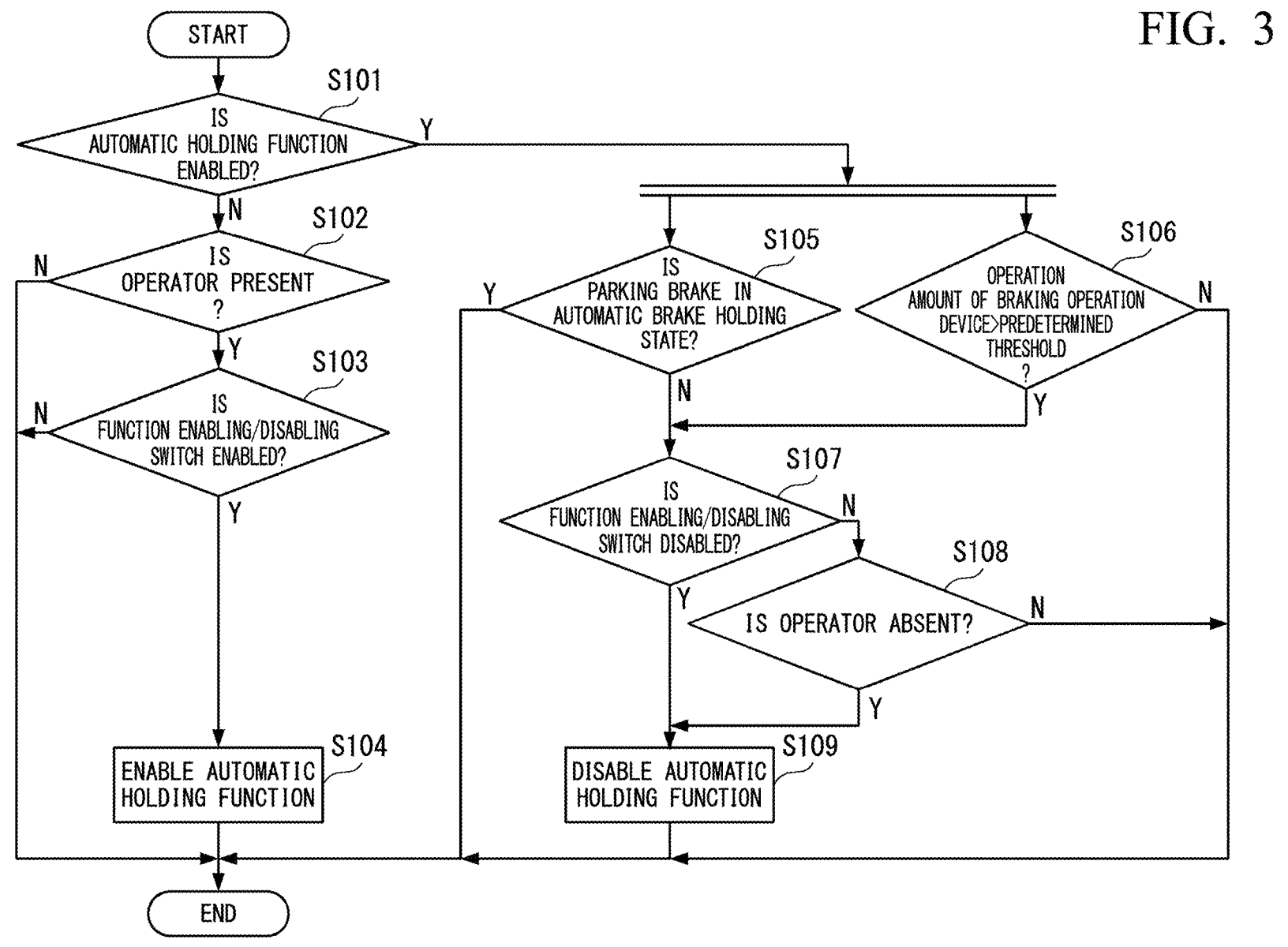

START

S101 — IS AUTOMATIC HOLDING FUNCTION ENABLED?

S102 — IS OPERATOR PRESENT?

S103 — IS FUNCTION ENABLING/DISABLING SWITCH ENABLED?

S104 — ENABLE AUTOMATIC HOLDING FUNCTION

S105 — IS PARKING BRAKE IN AUTOMATIC BRAKE HOLDING STATE?

S106 — OPERATION AMOUNT OF BRAKING OPERATION DEVICE>PREDETERMINED THRESHOLD?

S107 — IS FUNCTION ENABLING/DISABLING SWITCH DISABLED?

S108 — IS OPERATOR ABSENT?

S109 — DISABLE AUTOMATIC HOLDING FUNCTION

END

CONTROL SYSTEM FOR WORK MACHINE, CONTROL METHOD FOR WORK MACHINE, AND WORK MACHINE

CROSS-REFERENCE TO RELATED APPLICATIONS

This application is a U.S. National stage application of International Application No. PCT/JP2022/006762, filed on Feb. 18, 2022. This U.S. National stage application claims under 35 U.S.C. § 119(a) to Japanese Patent Application No. 2021-026006, filed in Japan on Feb. 22, 2021, the entire contents of which are hereby incorporated herein by reference.

BACKGROUND

Technical Field

The present invention relates to a control system for a work machine, a control method for a work machine, and a work machine.

Background Information

Japanese Unexamined Patent Application, First Publication No. 2000-309256 describes a parking brake device having a holding function as follows. That is, in the parking brake device disclosed in Japanese Unexamined Patent Application, First Publication No. 2000-309256, when a brake pedal is operated and a vehicle speed is equal to or lower than a stop vehicle speed, a parking brake is automatically controlled to a braking state. According to this configuration, an operator does not need to put the parking brake into the braking state, and the parking brake can be automatically switched to the braking state. In addition, in the parking brake device, an accelerator pedal is operated in a state where a shift lever is not at a neutral position, and braking of the parking brake held in the braking state is released when an engine rotation speed is equal to or higher than a predetermined rotation speed corresponding to a load of a cargo loaded on a fork. According to this configuration, it is possible to prevent an industrial vehicle from rolling back when the braking of the parking brake is released on an upward slope in a state where the cargo is loaded.

SUMMARY

According to the holding function of the parking brake disclosed in Japanese Unexamined Patent Application, First Publication No. 2000-309256, it is no longer necessary to operate the parking brake, and it is possible to eliminate the need to continuously step on the brake pedal, for example, when the industrial vehicle is temporarily stopped on a slope. However, in the parking brake device disclosed in Japanese Unexamined Patent Application, First Publication No. 2000-309256, the parking brake may be controlled contrary to an operator's intention, thereby causing a problem in that the operability of a work machine may be degraded.

The present invention is made in view of the above-described circumstances, and an object of the present invention is to provide a control system for a work machine, a control method for a work machine, and a work machine, which can improve the operability of a work machine.

According to an aspect of the present invention, in order to solve the above-described problems, a control system for a work machine is provided, including work equipment, a traveling device, and a parking brake. The control system includes a controller configured to output a control command to control the parking brake based on at least a motion state of the work equipment.

In addition, according to another aspect of the present invention, a control method for a work machine is provided, including work equipment, a traveling device, and a parking brake. The control method includes a step of outputting a control command to control the parking brake based on at least a motion state of the work equipment.

In addition, according to another aspect of the present invention, a work machine is provided, including work equipment, a traveling device, a parking brake, and a controller configured to output a control command to control the parking brake based on at least state a motion of the work equipment.

According to each aspect of the present invention, it is possible to improve the operability of a work machine.

BRIEF DESCRIPTION OF DRAWINGS

FIG. 3 is a flowchart representing an operation example of a controller according to the embodiment.

DETAILED DESCRIPTION OF EMBODIMENT(S)

First Embodiment

Figure 1:
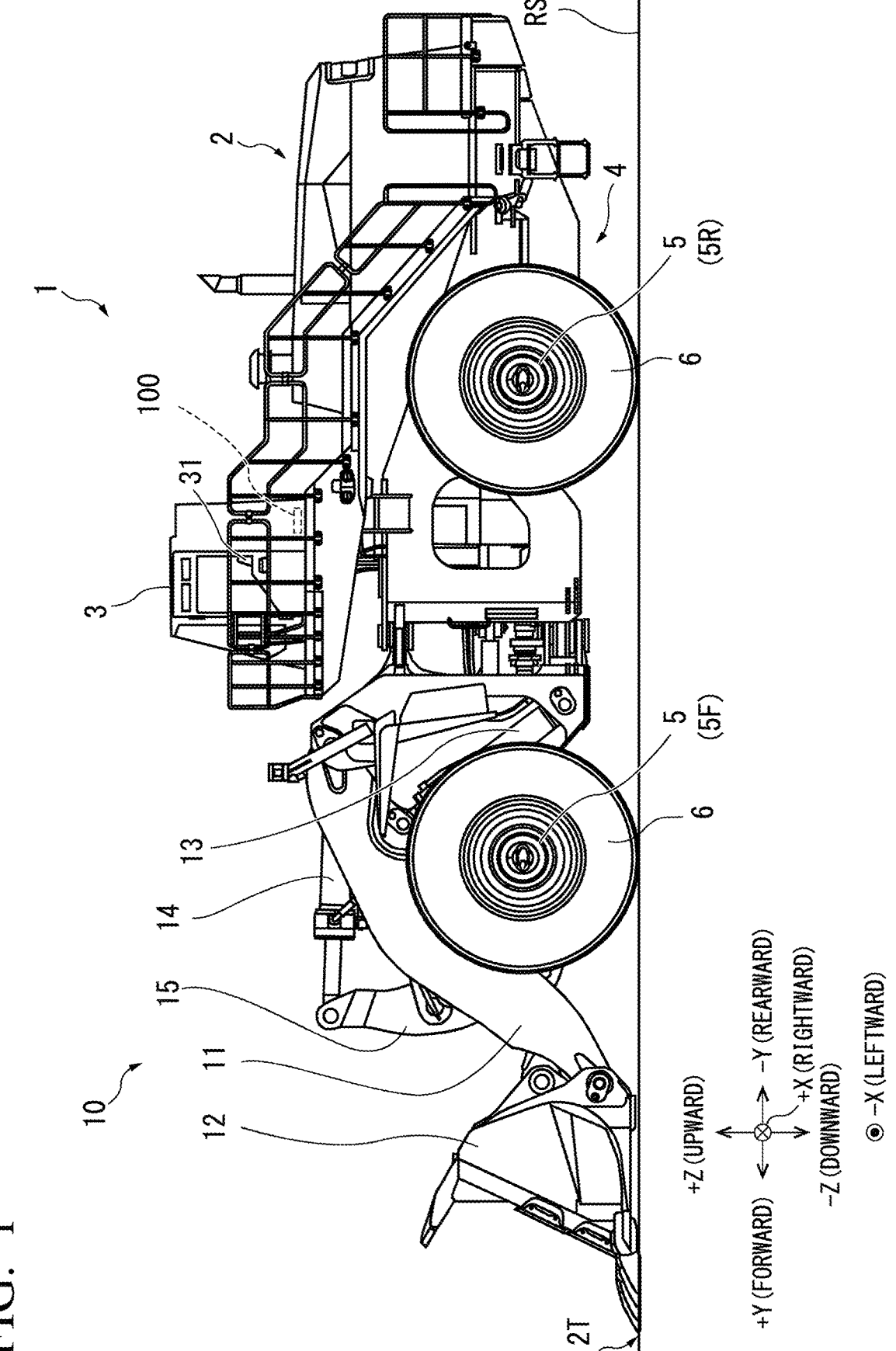
FIG. 1 is a side view representing a work machine according to an embodiment.

Hereinafter, a first embodiment of the present invention will be described with reference to the drawings. With regard to the first embodiment and a second embodiment, the same reference numerals or reference numerals in which the letter "a" or "b" is suffixed to the same numerals are used for the same or corresponding configurations in each drawing, and descriptions thereof will be omitted as appropriate.

In the present embodiment, a local coordinate system is set in a work machine 1, and a positional relationship of each unit will be described with reference to the local coordinate system. In the local coordinate system, a first axis extending in a rightward-leftward direction (vehicle width direction) of the work machine 1 will be defined as an X-axis, a second axis extending in a forward-rearward direction of the work machine 1 will be defined as a Y-axis, and a third axis extending in an upward-downward direction of the work machine 1 will be defined as a Z-axis. The X-axis and the Y-axis are orthogonal to each other. The Y-axis and the Z-axis are orthogonal to each other. The Z-axis and the X-axis are orthogonal to each other. A +X-direction is a rightward direction, and a −X-direction is a leftward direction. A +Y-direction is a forward direction, and a −Y-direction is a rearward direction. A +Z-direction is an upward direction, and a −Z-direction is a downward direction.

Overview of Work Machine

FIG. 1 is a side view representing the work machine 1 according to the embodiment. For example, the work machine 1 according to the embodiment is a wheel loader. In the following description, the work machine 1 will be referred to as a wheel loader 1 as appropriate.

As shown in FIG. 1, the wheel loader 1 has a vehicle body 2, a cab 3, a traveling device 4, and work equipment 10. The wheel loader 1 travels a work site using the traveling device 4. In the work site, the wheel loader 1 carries out work using the work equipment 10. The wheel loader 1 can use the work equipment 10 to carry out work such as excavation work, loading work, transportation work, and snow removal work. The work machine 1 may include the work equipment 10 and the traveling device 4, and for example, can be a dump truck, a forklift, or a motor grader.

The cab 3 is supported by the vehicle body 2. The cab 3 is internally provided with a driver's seat 31 on which an operator is seated and an operator operation device (not shown) operated by the operator to operate the wheel loader 1.

The traveling device 4 supports the vehicle body 2. In the present embodiment, the traveling device 4 has a rotatable wheel 5. The wheel loader 1 can travel on a road surface RS using the wheel 5 of the traveling device 4. FIG. 1 illustrates only a front wheel 5F on a left side and a rear wheel 5R. The traveling device of the work machine is not limited to a wheel, and may be a crawler belt.

The work equipment 10 is supported by the vehicle body 2. The work equipment 10 includes a bucket 12 as an example of a work tool, a boom 11 that changes the position and posture of the bucket 12, a boom cylinder 13, a bucket cylinder 14, a bell crank 15, and a link (not shown).

The boom 11 is supported so as to be rotatable with respect to the vehicle body 2, and moves in the upward-downward direction in accordance with expansion and contraction of the boom cylinder 13. The boom cylinder 13 is an actuator that generates power to move the boom 11, one end portion of which is connected to the vehicle body 2, and the other end portion of which is connected to the boom 11. When an operator operates a work equipment operation lever 81, the boom cylinder 13 expands and contracts. In this manner, the boom 11 moves in the upward-downward direction. For example, the boom cylinder 13 is a hydraulic cylinder.

The bucket 12 has bucket teeth 12T and is a working tool for excavating and loading an excavation object such as earth. The bucket 12 is connected so as to be pivotable with respect to the boom 11, and is connected so as to be pivotable with respect to one end portion of the link. The other end portion of the link is connected to one end portion of the bell crank 15 so as to be pivotable. In the bell crank 15, a central portion is connected to the boom 11 so as to be pivotable, and the other end portion is connected to one end portion of the bucket cylinder 14 so as to be pivotable. The other end portion of the bucket cylinder 14 is connected to the vehicle body 2 so as to be pivotable. The bucket 12 is operated by power generated by bucket cylinder 14. The bucket cylinder 14 is an actuator that generates power to move the bucket 12. When the operator operates the work equipment operation lever 81, the bucket cylinder 14 expands and contracts. In this manner, the bucket 12 swings. For example, the bucket cylinder 14 is a hydraulic cylinder.

Configuration of Control System

Figure 2:
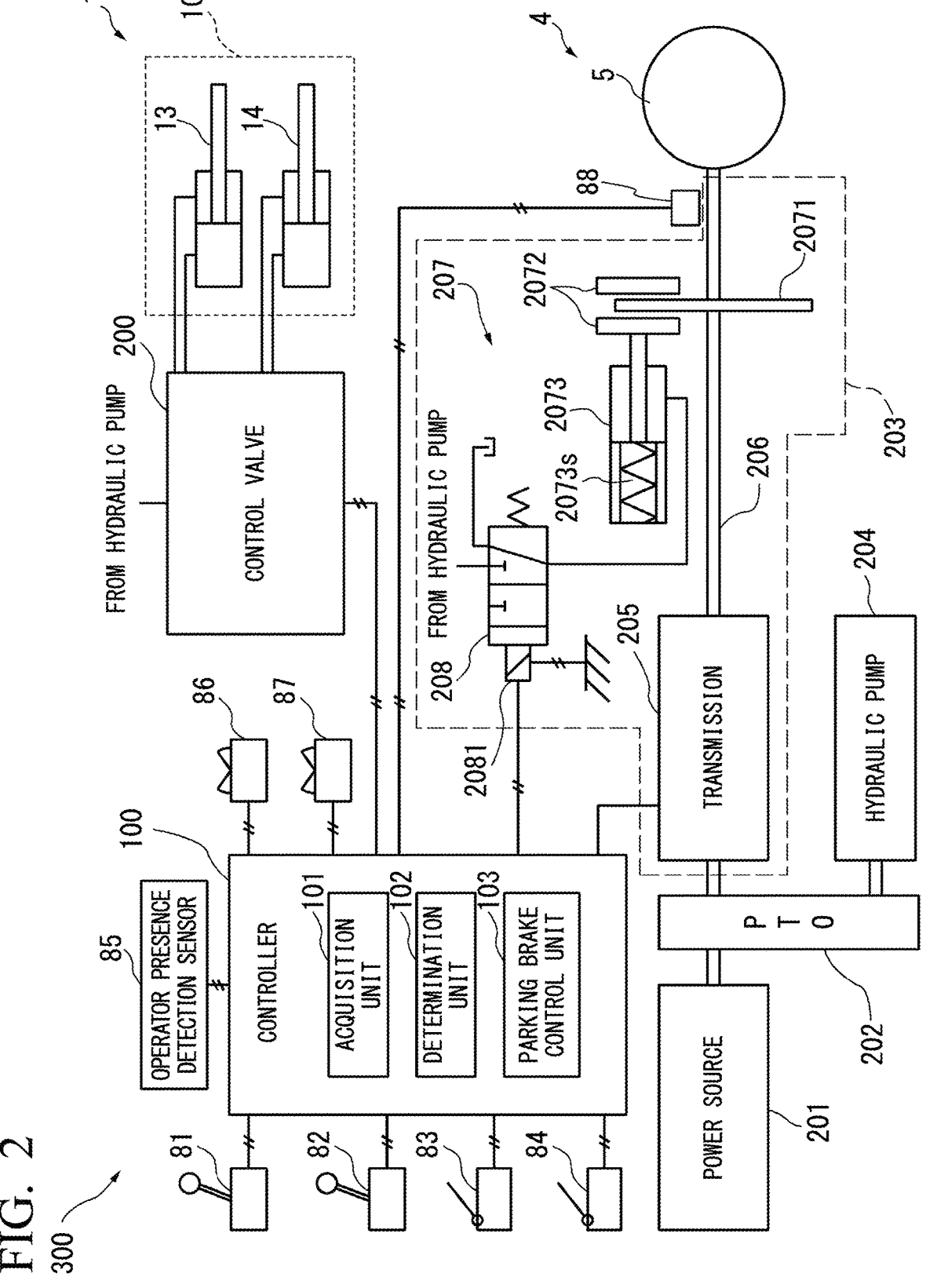
FIG. 2 is a schematic block diagram representing a configuration of a control system according to the embodiment.

FIG. 2 is a block diagram representing a configuration example of the control system 300 of the wheel loader 1 according to the embodiment. As shown in FIG. 2, the wheel loader 1 includes a power source 201, a power take-off (PTO) unit 202, a power transmission device 203, a hydraulic pump 204, a control valve 200, and a controller 100. In addition, the control system 300 is a control system for the wheel loader 1 (work machine) including the work equipment 10, the traveling device 4, and a parking brake 207, and includes at least the controller 100. Alternatively, the control system 300 further includes the work equipment operation lever 81 as an example of a work equipment operation device, a forward/rearward movement switching operation device 82, an accelerator operation device 83 as an example of a vehicle speed adjustment device, a braking operation device 84, an operator presence detection sensor a parking brake holding function enabling/disabling switch 86, a parking brake engaging/disengaging switch 87, and a vehicle speed sensor 88, which are devices to input predetermined signals to the controller 100.

The power source 201 generates power to operate the work machine 1. An internal combustion engine or an electric motor is an example of the power source 201. The power source 201 is not limited to an internal combustion engine or an electric motor. For example, the power source 201 may be a so-called hybrid device in which an internal combustion engine, a generator motor, and a power storage device are combined. In addition, the power source 201 may have a configuration in which a power storage device and a generator motor are combined without having an internal combustion engine.

The PTO 202 transmits at least some of the power of the power source 201 to the hydraulic pump 204. The PTO 202 distributes the power of the power source 201 to the power transmission device 203 and the hydraulic pump 204.

The power transmission device 203 has a transmission 205, a drive shaft 206, a parking brake 207, and a control valve 208. The transmission 205 outputs the power generated by the power source 201 to the drive shaft 206 by changing a torque, a rotation speed, or a rotation direction, or interrupts the power. The drive shaft 206 transmits the power from transmission 205 to the traveling device 4. The transmission 205 is not limited to a configuration having a plurality of gears and a plurality of clutches. The transmission 205 has a hydraulic pump and a hydraulic motor, and may include a hydraulic static transmission (HST) or a hydraulic mechanical transmission (HMT), which converts the power generated by the power source 201 into hydraulic pressure and transmits the hydraulic pressure. Alternatively, the transmission 205 may include an electric mechanical transmission (EMT) having a generator and an electric motor instead of the hydraulic pump and the hydraulic motor. In the present embodiment, the transmission 205 has a configuration capable of generating a creep phenomenon (phenomenon in which the work machine 1 moves forward or moves rearward at a very slow speed in a state where the accelerator operation device 83 (to be described later) is not operated).

The parking brake 207 includes a disc 2071 fixed to the drive shaft 206 and capable of rotating coaxially with the drive shaft 206, a friction member 2072 engaging with the disc 2071 (engaged state) or disengaging from the disc 2071 (disengaged state), and a hydraulic device 2073 to drive the friction member 2072. The hydraulic device 2073 includes a spring 2073s that causes the friction member 2072 to engage with the disc 2071 using a spring pressure when the hydraulic pressure is not supplied, and releases the friction member 2072 when the hydraulic pressure is supplied. The control valve 208 includes a solenoid 2081, and supplies hydraulic oil from the hydraulic pump 204 to the hydraulic device 2073 when electric power is supplied to the solenoid 2081. In this case, the parking brake 207 includes holding means (hydraulic device 2073 (spring 2073s)) for holding the braking members (disc 2071 and friction member 2072) in a braking state, and braking release means (hydraulic device 2073 and control valve 208) for releasing the braking state, and is operated as a negative brake brought into the braking state when a control signal (drive signal of the solenoid 2081) is not input to the braking release means. The parking brake 207 is not limited to those that use hydraulic pressure, and may be a parking brake that uses electric power or air pressure, for example. In addition, the parking brake 207 is not limited to a disc type brake, and may be a drum type brake, for example.

The hydraulic pump 204 is driven by the power generated by the power source 201, and discharges the hydraulic oil. At least some of the hydraulic oil discharged from the hydraulic pump 204 is supplied to each of the boom cylinder 13 and the bucket cylinder 14 via the control valve 200, and is supplied to the parking brake 207 via the control valve 208. The control valve 200 controls the flow rate and direction of the hydraulic oil supplied from the hydraulic pump 204 to each of the boom cylinder 13 and the bucket cylinder 14. The work equipment 10 is operated by the hydraulic oil from the hydraulic pump 204.

As shown in FIG. 2, the wheel loader 1 includes the work equipment operation lever 81, the forward/rearward movement switching operation device 82, the accelerator operation device 83, the braking operation device 84, the operator presence detection sensor 85, the parking brake holding function enabling/disabling switch 86, the parking brake engaging/disengaging switch 87, and operation devices such as a steering device (not shown). The operation devices are operated by an operator to operate the wheel loader 1.

The work equipment operation lever 81 (work equipment operation device) is an operation device to operate the work equipment 10. The operator operates the work equipment 10 by operating the work equipment operation lever 81. For example, the work equipment operation lever 81 outputs a signal to move the boom 11 upward or downward by performing an operation in the rightward-leftward direction, and outputs a signal to bring the bucket 12 into a holding state or a dumping state by performing an operation in the forward-rearward direction. An operation state of the work equipment operation lever 81 is a neutral state when not operated by the operator, and is a state (tilted state) of being tilted in the rightward-leftward direction and the forward-rearward direction in accordance with an operation of the operator. In addition, a dead zone is provided near a neutral position of the work equipment operation lever 81. The motion state of the work equipment 10 is a non-motion state (non-moving state; stopped state) when the operation state of the work equipment operation lever 81 is in the neutral state or the operation amount is within the dead zone. In addition, the motion state of the work equipment 10 is the motion state (moving state) when the operation state of the work equipment operation lever 81 is not in the neutral state and the operation amount is not within the dead zone. In the description of the operation example of the controller 100 (to be described later), in a case where the work equipment operation lever 81 is in the neutral state (state where the work equipment operation lever 81 is not operated by the operator) and in a case where the operation amount of the work equipment operation lever 81 is within the dead zone (state where the work equipment operation lever 81 is operated by the operator, but the operation amount is smaller than a predetermined size), both cases will be described in which the operation state of the work equipment operation lever 81 is in "neutral" state (or the work equipment operation lever 81 is in "neutral" state). In addition, for example, information indicating the motion state of the work equipment 10 includes information obtained from a sensor configured to detect an angle, a length, or a load, of the work equipment 10, information indicating a control signal for an actuator to operate the work equipment 10, information indicating the operation state of the work equipment operation lever 81 operated by the operator, and a combination thereof. In the present embodiment, it is assumed that the information indicating the operation state of the work equipment 10 includes at least the information indicating the operation state of the work equipment operation device operated by the operator to operate the work equipment 10. For example, a plurality of the work equipment operation levers 81 may be provided independently of a lever to operate the boom 11 and a lever to operate the bucket 12. The work equipment operation lever 81 electrically detects the operation state (tilting direction or tilting amount) of the lever, and outputs a signal indicating the operation state to the controller 100. The work equipment operation lever 81 may be a mechanical type lever, or may use a pressure proportional control valve (PPC valve).

The forward/rearward movement switching operation device 82 is an operation device to switch a traveling state of the wheel loader 1 to forward movement, neutral, or rearward movement. In the present embodiment, the forward/rearward movement switching operation device 82 is a lever-type operation device. The forward/rearward movement switching operation device 82 outputs a signal indicating the operation state of forward movement, neutral, or rearward movement to the controller 100. The forward/rearward movement switching operation device 82 is not limited to a lever, and for example, a switching operation for forward movement, neutral, or rearward movement may be performed using a switch.

The accelerator operation device 83 is an operation device that increases or decreases the output of the power source 201. The operator can adjust the vehicle speed of the wheel loader 1 by operating the accelerator operation device 83. Accordingly, the accelerator operation device 83 functions as a vehicle speed adjustment device. In the present embodiment, the accelerator operation device 83 is a pedal-type operation device. The accelerator operation device 83 outputs a signal indicating the operation state to controller 100. The accelerator operation device 83 is not limited to a pedal-type operation device, and may be a dial-type or lever-type operation device, for example.

The braking operation device 84 is an operation device to operate a braking device called a service brake (or a regular brake) used to decelerate or stop the wheel loader 1. In the present embodiment, the accelerator operation device 83 is a pedal-type operation device. The braking operation device 84 outputs a signal indicating the operation state (operation amount) to the controller 100. The braking operation device 84 is not limited to a pedal-type operation device.

The operator presence detection sensor 85 is a sensor that detects whether the operator is present inside the cab 3, and outputs a signal indicating a detection result to the controller 100. For example, the operator presence detection sensor 85 can be configured using a seatbelt sensor, a seat (seating) sensor, a work equipment lock lever (switch), a sensor that detects the posture or movement of the operator (imaging device or motion sensor), a door unlock sensor (switch), or a door opening/closing switch.

The parking brake holding function enabling/disabling switch 86 is a switch for setting whether to enable or disable an automatic holding function of the parking brake 207. In the present embodiment, the automatic holding function of the parking brake 207 is a function of the controller 100 to automatically hold an engaged state by bringing the parking brake 207 into the engaged state, or to bring the held engaged state into a disengaged state. The parking brake holding function enabling/disabling switch 86 is a switch that is turned on (enabled) or off (disabled) in accordance with an operation of the operator, and outputs a signal indicating an on-state or an off-state to the controller 100.

The parking brake engaging/disengaging switch 87 is a switch to operate the parking brake 207 in an engaged state or a disengaged state. When the parking brake engaging/disengaging switch 87 is operated (set) for engagement, the parking brake 207 is brought into the engaged state, regardless of whether the automatic holding function of the parking brake 207 is set to be enabled or disabled. When the parking brake engaging/disengaging switch 87 is operated for disengagement, the parking brake 207 is brought into the disengaged state when the automatic holding function of the parking brake 207 is disabled. In addition, when the parking brake engaging/disengaging switch 87 is operated for disengagement, when the automatic holding function of the parking brake 207 is enabled, and when the controller 100 activates the automatic holding function, the parking brake 207 is brought into the engaged state. On the other hand, when the controller 100 does not activate the automatic holding function, the parking brake 207 is brought into the disengaged state.

The parking brake engaging/disengaging switch 87 is a switch that is turned on or off in accordance with an operation of the operator, and outputs a signal indicating an on-state or an off-state to the controller 100, for example. Alternatively, the parking brake engaging/disengaging switch 87 may be a switch forming a subsequent circuit when turned off for the engagement operation. That is, in the parking brake engaging/disengaging switch 87, one end is connected to a DC power supply, and the other end is connected to one end of a switch (mechanical switch or semiconductor switch, not shown) inside the controller 100. In addition, the other end of the switch inside controller 100 is connected to one end of the solenoid 2081, and the other end of the solenoid 2081 is connected to the ground of the DC power supply. In this case, when the parking brake engaging/disengaging switch 87 is turned off (engagement operation), the electric power supplied to the solenoid 2081 is interrupted, and the parking brake 207 is operated in the engaged state. When the parking brake engaging/disengaging switch 87 is turned on (disengagement operation), the electric power is supplied to the solenoid 2081, and depending on whether the switch inside the controller 100 is turned on or off, the parking brake 207 is operated in the disengaged state or the engaged state.

In addition, the vehicle speed sensor 88 detects the vehicle speed of the wheel loader 1. The vehicle speed sensor 88 outputs a signal (vehicle speed signal) indicating the vehicle speed of the wheel loader 1 to the controller 100.

Configuration of Controller

For example, the controller 100 shown in FIG. 2 is configured using a field-programmable gate array (FPGA) or a microcomputer having a processor, a main memory device, an auxiliary memory device, and an input/output device, and a peripheral circuit thereof or a peripheral device. The controller 100 includes an acquisition unit 101, a determination unit 102, and a parking brake control unit 103, as a functional configuration including hardware or a combination of hardware and software such as a program.

At a predetermined cycle, the acquisition unit 101 repeatedly acquires each output signal of the work equipment operation lever 81, the forward/rearward movement switching operation device 82, the accelerator operation device 83, the braking operation device 84, the operator presence detection sensor 85, the parking brake holding function enabling/disabling switch 86, the parking brake engaging/disengaging switch 87, and the vehicle speed sensor 88.

The determination unit 102 determines whether or not each output signal acquired by the acquisition unit 101 satisfies a predetermined condition. For example, based on each output signal acquired by the acquisition unit 101, the determination unit 102 performs a process of determining and setting whether to enable or disable the automatic holding function of the parking brake 207, and performs a process of determining whether to bring the parking brake 207 into an engaged state or a disengaged state when the automatic holding function is enabled.

The parking brake control unit 103 outputs a control command to control the parking brake 207 to be in the engaged state or the disengaged state in accordance with a determination result of the determination unit 102.

Operation Example of Controller

Figure 4:
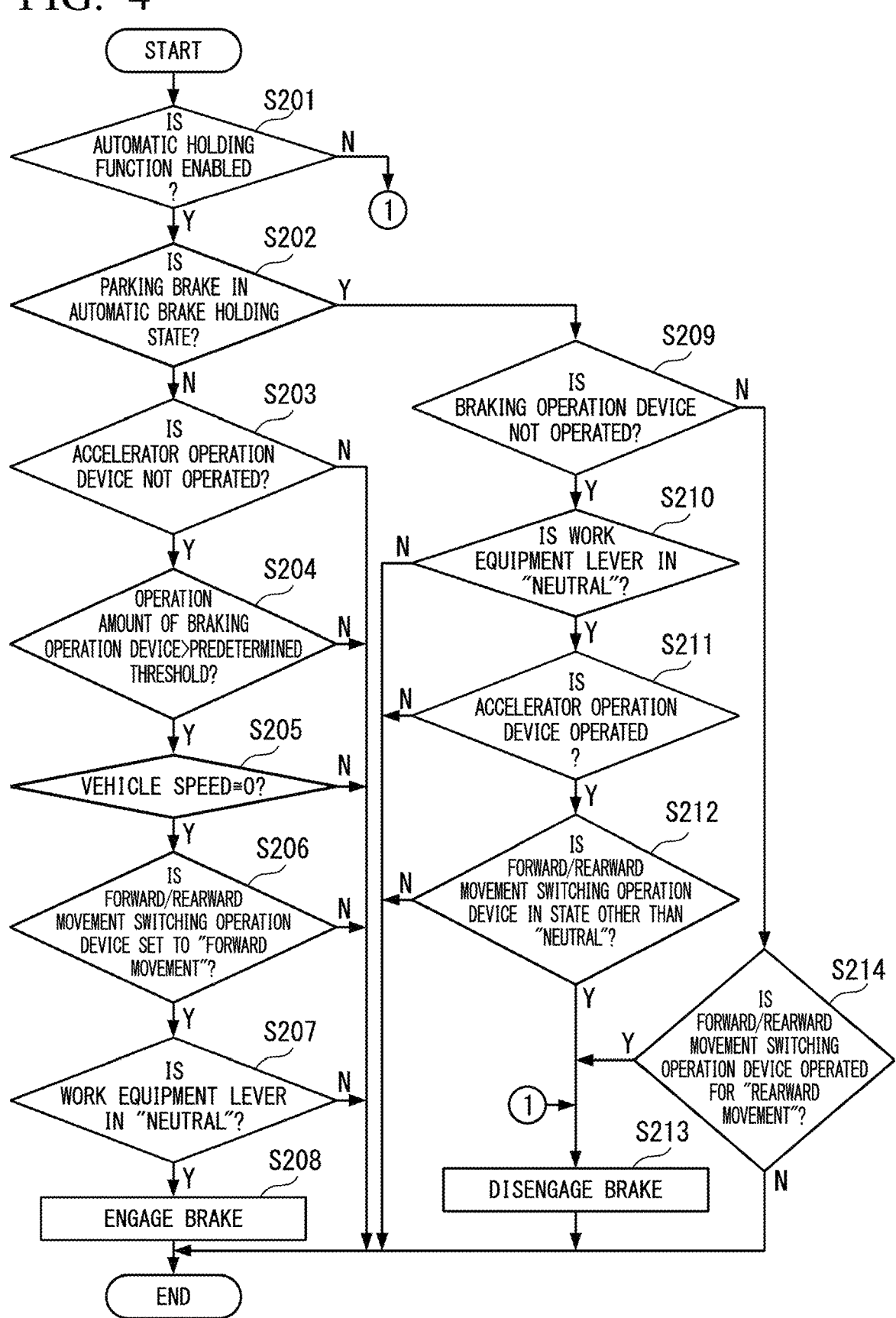
FIG. 4 is a flowchart representing an operation example of the controller according to the embodiment.

FIGS. 3 and 4 are flowcharts representing an operation example of the controller 100 according to the embodiment. FIG. 3 represents a process when the controller 100 determines and sets whether to enable or disable the automatic holding function of the parking brake 207. FIG. 4 represents a process when the controller 100 outputs a command by determining whether to bring the parking brake 207 into the engaged state or the disengaged state. The process shown in FIG. 3 and the process shown in FIG. 4 are sequentially and repeatedly performed in the same or different cycles. In the operation example, a state where the parking brake 207 is held in the engaged state under the control of the controller 100 will be referred to as an automatic brake holding state. In addition, it is assumed that the parking brake engaging/disengaging switch 87 is set to disengagement.

When the process shown in FIG. 3 starts, first, the determination unit 102 determines whether or not the automatic holding function has been enabled (Step S101). When the automatic holding function is not enabled (=disabled) (case of "N" in Step S101), the determination unit 102 determines whether or not the operator presence detection sensor 85 has detected the presence of the operator (Step S102). When the operator presence detection sensor 85 has detected the presence of the operator (case of "Y" in Step S102), the determination unit 102 determines whether or not the parking brake holding function enabling/disabling switch 86 is set to be enabled (Step S103). When the parking brake holding function enabling/disabling switch 86 is set to be enabled (case of "Y" in Step S103), the determination unit 102 sets the automatic holding function to be enabled (Step S104), and completes the process shown in FIG. 3. On the other hand, when the operator presence detection sensor 85 has not detected the presence of the operator (case of "N" in Step S102), or when the parking brake holding function enabling/disabling switch 86 is set to be disabled (case of "N" in Step S103), the determination unit 102 completes the process shown in FIG. 3.

On the other hand, when the automatic holding function has been enabled (case of "Y" in Step S101), the determination unit 102 determines in parallel whether or not the parking brake is in the automatic brake holding state described above (Step S105) and whether or not the operation amount of the braking operation device 84 is greater than a predetermined threshold (Step S106). When the parking brake is in the automatic brake holding state (case of "Y" in Step S105), the determination unit 102 completes the process shown in FIG. 3. When the parking brake is not in the automatic brake holding state (case of "N" in Step S105), or when the operation amount of the braking operation device 84 is greater than the predetermined threshold (case of "Y" in Step S106), the determination unit 102 determines whether or not the parking brake holding function enabling/disabling switch 86 is set to be disabled (Step S107). When the parking brake holding function enabling/disabling switch 86 is set to be enabled (case of "N" in Step S107), the determination unit 102 determines whether or not the operator presence detection sensor 85 has detected the presence of the operator (Step S108). When the parking brake holding function enabling/disabling switch 86 is set to be disabled (case of "Y" in Step S107), or when the operator presence detection sensor 85 has not detected the presence of an operator (case of "Y" in Step S108), the determination unit 102 sets the automatic holding function to be disabled (Step S109), and completes the process shown in FIG. 3. On the other hand, when the operation amount of the braking operation device 84 is not greater than the predetermined threshold (case of "N" in Step S106), or when the operator presence detection sensor 85 has detected the presence of the operator (case of "N" in Step S108), the determination unit 102 completes the process shown in FIG. 3.

In the process shown in FIG. 3, when "the automatic holding function is enabled", and when "the parking brake is not in the automatic brake holding state (=brake disengaged state)" and (the "parking brake holding function enabling/disabling switch 86 is disabled" or "the operator is not present"), or when "the operation amount of the braking operation device 84 is greater than the predetermined threshold" and ("the parking brake holding function enabling/disabling switch 86 is disabled" or "the operator is not present"), the controller 100 sets the automatic holding function to be disabled. In addition, when "the automatic holding function is disabled", and when "the operator is present" and "the parking brake holding function enabling/disabling switch 86 is enabled", the controller 100 sets the automatic holding function to be enabled.

Next, when the process shown in FIG. 4 starts, first, the determination unit 102 determines whether or not the automatic holding function has been enabled (Step S201). When the automatic holding function has not been enabled (=disabled) (case of "N" in Step S102), the parking brake control unit 103 controls the parking brake 207 to be in the disengaged state (Step S213), and completes the process shown in FIG. 4. However, when the parking brake 207 has already been controlled to be in the disengaged state, the parking brake control unit 103 omits the process of controlling the parking brake 207 to be in the disengaged state, and completes the process shown in FIG. 4.

On the other hand, when the automatic holding function has been enabled (case of "Y" in Step S201), the determination unit 102 determines whether or not the parking brake is in the automatic brake holding state (Step S202). When the parking brake is not in the automatic brake holding state (case of "N" in Step S202), the determination unit 102 determines whether or not the accelerator operation device 83 is operated (Step S203). When the accelerator operation device 83 is not operated (case of "Y" in Step S203), the determination unit 102 determines whether or not the operation amount of the braking operation device 84 is greater than the predetermined threshold (Step S204). When the operation amount of the braking operation device 84 is greater than the predetermined threshold (case of "Y" in Step S204), the determination unit 102 determines whether or not the vehicle speed is substantially zero (=lower than the predetermined threshold) (Step S205). When the vehicle speed is substantially zero (case of "Y" in Step S205), the determination unit 102 determines whether or not the forward/rearward movement switching operation device 82 is operated for the "forward movement" (Step S206). When the forward/rearward movement switching operation device 82 is operated for the "forward movement" (case of "Y" in Step S206), the determination unit 102 determines whether or not the operation state of the work equipment operation lever 81 is in "neutral" (Step S207). When the work equipment operation lever 81 is in "neutral" (=the work equipment operation lever 81 is not operated, or the operation amount of the work equipment operation lever 81 is within the dead zone) (case of "Y" in Step S207), the parking brake control unit 103 outputs a control command to control the parking brake 207 to be in the engaged state (stops transmitting a drive signal to the solenoid 2081) (Step S208), and completes the process shown in FIG. 4.

On the other hand, when the parking brake is in the automatic brake holding state (case of "N" in Step S202), the determination unit 102 determines whether or not the braking operation device 84 is operated (Step S209). When the braking operation device 84 is not operated (case of "Y" in Step S209), the determination unit 102 determines whether or not the operation state of the work equipment operation lever 81 is in "neutral" (Step S210). When the work equipment operation lever 81 is in "neutral" (case of "Y" in Step S210), the determination unit 102 determines whether or not the accelerator operation device 83 is operated (Step S211). When the accelerator operation device 83 is operated (case of "Y" in Step S211), the determination unit 102 determines whether or not the forward/rearward movement switching operation device 82 is in a state other than "neutral" (Step S212). When the forward/rearward movement switching operation device 82 is in the state other than "neutral" (case of "Y" in Step S212), the parking brake control unit 103 controls the parking brake 207 to be in the disengaged state (Step S213), and completes the process shown in FIG. 4.

On the other hand, when the braking operation device 84 is operated (case of "N" in Step S209), the determination unit 102 determines whether or not the forward/rearward movement switching operation device 82 is operated for the "rearward movement" (Step S214). When the forward/rearward movement switching operation device 82 is operated for the "rearward movement" (case of "Y" in Step S214), the parking brake control unit 103 controls the parking brake 207 to be in the disengaged state (Step S213), and completes the process shown in FIG. 4.

On the other hand, when the accelerator operation device 83 is operated (case of "N" in Step S203), when the operation amount of the braking operation device 84 is not greater than the predetermined threshold (case of "N" in Step S204), when the vehicle speed is not substantially zero (case of "N" in Step S205), when the forward/rearward movement switching operation device 82 is not operated for the "forward movement" (case of "N" in Step S206), when the work equipment operation lever 81 is not in "neutral" (case of "N" in Step S207), when the work equipment operation lever 81 is not in "neutral" (case of "N" in Step S210), when the accelerator operation device 83 is not operated (case of "N" in Step S211), when the forward/ rearward movement switching operation device 82 is not in the state other than "neutral" (when "N" in Step S212), or when the forward/rearward movement switching operation device 82 is not operated for the "rearward movement" (case of "N" in Step S214), the determination unit 102 completes the process shown in FIG. 4.

In the process shown in FIG. 4, when the parking brake is not in the automatic brake holding state, and when "the automatic holding function is enabled", "the accelerator operation device 83 is not operated", "the operation amount of the braking operation device 84 is greater than the predetermined threshold", "the vehicle speed is substantially zero", "the forward/rearward movement switching operation device 82 is operated for the "forward movement"", and "the work equipment operation lever 81 is in "neutral"", the controller 100 controls the parking brake 207 to be in the engaged state. On the other hand, when the parking brake is in the automatic brake holding state, and when "the automatic holding function is disabled", or "the braking operation device 84 is not operated", "the work equipment operation lever 81 is in "neutral", the "accelerator operation device 83 is operated, and "the forward/rearward movement switching operation device 82 is not in the state other than "neutral"", or "the braking operation device 84 is operated", and "the forward/rearward movement switching operation device 82 is operated for the "rearward movement"", the controller 100 controls the parking brake 207 to be in the disengaged state.

According to the above-described processes, when the controller 100 (brake control device for the work machine) controls the parking brake 207 in the work machine 1 including the work equipment 10, the traveling device 4, and the parking brake 207, the parking brake control unit 103 outputs a control command to control the parking brake 207 based on at least the motion state of the work equipment 10. According to this configuration, for example, the parking brake control unit 103 can control the parking brake 207 to be in the engaged state or the disengaged state, when at least the work equipment 10 is in the non-motion state (stopped state). In this case, during an operation of the work equipment 10, it is possible to prevent the parking brake from being automatically engaged and held, or to prevent the held engaged state from being automatically brought into the disengaged state. According to this configuration, it is possible to prevent the automatic holding function from being unintentionally activated or cancelled during the operation of the work equipment 10. Therefore, it is possible to improve the operability of the work equipment such as degradation in an operability associated with adoption of the automatic holding function of the parking brake.

The process shown in FIGS. 3 and 4 is an example, and can be changed as appropriate. For example, Step S206 (determining whether or not the forward/rearward movement switching operation device 82 is in the "forward movement") may be omitted. In addition, Step S214 (determining whether or not the forward/rearward movement switching operation device 82 is in the "rearward movement") may be omitted, or may be replaced with determining whether or not there is a change in position ("forward movement", "rearward movement", or "neutral") when the brake is brought into the engaged state. In addition, when the parking brake control unit 103 controls the parking brake 207 to be in the engaged state (Step S206), for example, the parking brake control unit 103 may further output a predetermined control command (second control command) to control the transmission 205 to interrupt power transmission to the wheels 5 (traveling device 4).

In the above-described processes, the parking brake control unit 103 outputs a control command to control the parking brake 207 to be in the engaged state when the work equipment 10 is in a non-motion state, the accelerator operation device 83 (vehicle speed adjustment device) of the work machine 1 is in a non-operation state, the speed of work machine 1 is substantially zero (lower than the predetermined threshold), the operation amount of the braking operation device 84 of the work machine 1 is greater than the predetermined threshold, and the forward/rearward movement switching operation device 82 of the work machine 1 is operated for the forward movement.

In addition, when the operator of the work equipment 10 is present, and the holding function of the parking brake 207 is set to an enabling state (the parking brake holding function enabling/disabling switch 86 is set to be enabled), the parking brake control unit 103 further sets the automatic holding function to be enabled, and when a predetermined condition is satisfied, the parking brake control unit 103 outputs a control command to control the parking brake 207 to be in the engaged state.

In addition, the parking brake control unit 103 outputs a control command to control the parking brake 207 to be in the disengaged state when the work equipment 10 is in the non-operation state, the accelerator operation device 83 (vehicle speed adjustment device) of the work machine 1 is in the operation state, and the braking operation device 84 of the work machine 1 is in the non-operation state.

In addition, when the parking brake 207 is controlled to be in the engaged state, and when the forward/rearward movement switching operation device 82 (forward/rearward movement switching device) of the work machine 1 is operated for the rearward movement, the parking brake control unit 103 outputs a control command to control the parking brake 207 to be in the disengaged state.

Operational Effect of Embodiment

As described above, according to the present embodiment, it is possible to easily prevent the automatic holding function from being activated or cancelled contrary to an operator's intention during the operation of the work equipment 10. Therefore, it is possible to improve the operability.

In the operation of the work machine, in some cases, after the work equipment is finely adjusted by temporarily stopping the work machine to finely adjust a position of the work equipment, the operator may want to quickly start the work machine. In this case, according to the parking brake device disclosed in Patent Document 1, the parking brake is automatically controlled to be in a braking state when the vehicle speed is equal to or lower than the stop vehicle speed during the temporary stop. For example, after the operator completes fine adjustment of the position of the work equipment, although the operator wants to quickly start the work machine by reducing the operation amount of the braking operation device, for example, using a creep phenomenon, the operator cannot start the work machine as intended, when the parking brake is in the braking state. In contrast, according to the present embodiment, the automatic holding function of the parking brake 207 is not activated while the work equipment 10 is operated. Therefore, the work machine 1 is stopped by stepping on the braking operation device 84. At the same time (or immediately before the work machine 1 is stopped), the work equipment (bucket or fork) is operated to finely adjust the position. After the fine adjustment is completed, the operator can quickly start the work machine 1 by reducing the operation amount of the braking operation device 84, for example, using the creep phenomenon.

In addition, in the operation of the work machine, when only the work equipment is moved while the vehicle is stopped for standby, the accelerator operation device is operated to increase the rotation speed of an engine (hydraulic pump) in order to increase the operation speed of the work equipment. In some cases, an operation is performed to increase the amount of oil supplied to the work equipment. In this case, according to the parking brake device disclosed in Patent Document 1, when the engine rotation speed is equal to or higher than a predetermined rotation speed corresponding to a load of a cargo loaded on a fork, braking of the parking brake held in the braking state is released. In this case, when the accelerator operation device is operated, although the operator may not want the forward movement of the work machine, there is a possibility that the work machine may unintentionally move forward due to the release of the brake. In contrast, in the present embodiment, the automatic holding function of the parking brake 207 is not cancelled while the work equipment 10 is operated. Therefore, when only the work equipment 10 is moved while the vehicle is stopped for standby, and when the accelerator operation device 83 is operated to increase the rotation speed of the power source 201 in order to increase the operation speed of the work equipment 10, and the work equipment 10 is operated in a state where the amount of oil supplied to the work equipment 10 is increased, it is possible to prevent the work machine 1 from unintentionally moving forward due to the release of the parking brake 207 even though the operator may not want the forward movement of the work machine.

Second Embodiment

Figure 5:
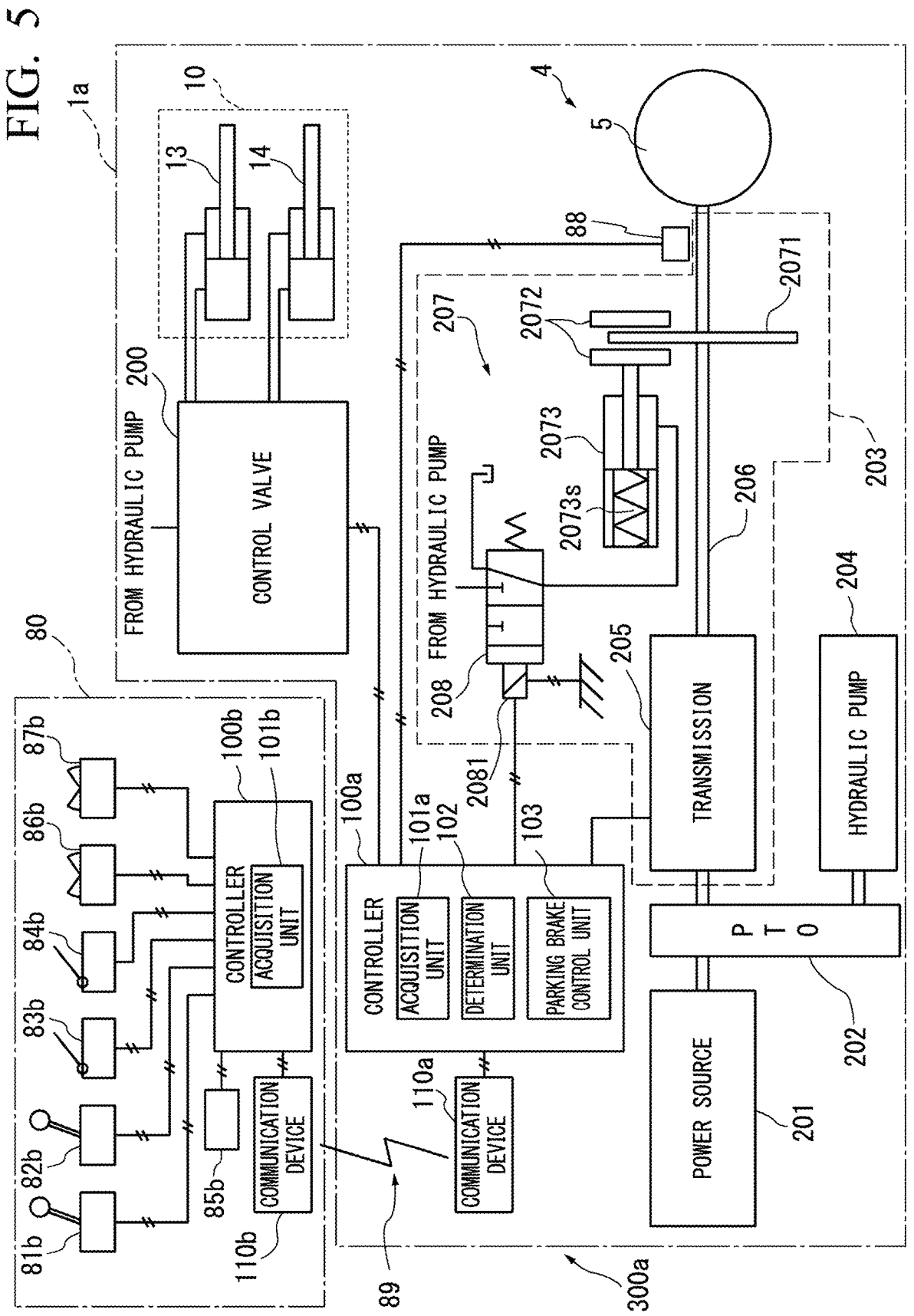
FIG. 5 is a schematic block diagram representing another configuration of the control system according to the embodiment.

Hereinafter, a second embodiment of the present invention will be described with reference to FIG. 5. FIG. 5 is a block diagram representing a configuration example of a control system for a wheel loader 1_a_ according to the second embodiment. A control system 300_a_ shown in FIG. 5 is a control system for the wheel loader 1_a_ including the work equipment 10, the traveling device 4, and the parking brake 207, and includes at least a controller 100_a_ (or at least the controller 100_a_ and a controller 100_b_). Alternatively, the control system 300_a_ further includes a work equipment operation lever 81_b_ as an example of the work equipment operation device, a forward/rearward movement switching operation device 82_b_, an accelerator operation device 83_b_ as an example of the vehicle speed adjustment device, a braking operation device 84_b_, and an operator presence detection sensor 85_b_, which are devices to input a predetermined signal to the controller 100_a_ (or the controller 100_a_ and the controller 100_b_). In the first embodiment, the operator inside the cab 3 operates the wheel loader 1 by operating the work equipment operation lever 81, the forward/rearward movement switching operation device 82, the accelerator operation device 83, and the braking operation device 84 inside the cab 3. In contrast, in the second embodiment, the work equipment operation lever 81_b_, the forward/rearward movement switching operation device 82_b_, the accelerator operation device 83_b_, the braking operation device 84_b_, and the operator presence detection sensor 85_b_, a parking brake holding function enabling/disabling switch 86_b_, and a parking brake engaging/disengaging switch 87_b_ are provided inside an operation room 80 separated from the wheel loader 1_a_. The operator inside the operation room 80 remotely operates the wheel loader 1_a_ by operating the work equipment operation lever 81_b_, the forward/rearward movement switching operation device 82_b_, the accelerator operation device 83_b_, and the braking operation device 84_b_ inside the operation room 80.

The controller 100_b_ and a communication device 110_b_ are provided inside the operation room 80, and a communication device 110_a_ is provided in the wheel loader 1_a_. Predetermined information is transmitted and received using a radio signal 89 between the controller 100_b_ and the controller 100_a_ via the communication device 110_b_ and the communication device 110_a_. Other information such as video information, position information, distance measurement information, and various types of monitoring information used for a remote operation are transmitted and received between the controller 100_b_ and the controller 100_a_. However, for ease, a configuration to acquire or output information will be omitted in the drawings. In addition, a combination of an acquisition unit 101_b_ included in the controller 100_b_ and an acquisition unit 101_a_ included in the controller 100_a_ has the same function as the acquisition unit 101 shown in FIG. 1.

In addition, an operation of the combination of the controller 100_a_ and the controller 100_b_ can be the same as the operation of the controller 100 shown in FIG. 1 described with reference to FIG. 3.

According to the present embodiment, as in the first embodiment, it is possible to easily prevent the automatic holding function from being unintentionally activated or cancelled during the remote operation of the work equipment 10. Therefore, it is possible to easily improve the operability of the work machine.

Modification Example of Present Embodiment or Other Embodiment

Hitherto, the embodiments of the present invention have been described with reference to the drawings. However, the specific configuration is not limited to the above-described embodiments, and includes design changes within the scope not departing from the concept of the present invention.

In addition, programs executed by a computer in the above-described embodiment can be partially or entirely distributed via a computer-readable recording medium or a communication line.

According to each aspect of the present invention, it is possible to improve the operability of a work machine.

What is claimed is:

1. A control system for a work machine including a vehicle body, work equipment operated with respect to the vehicle body, a traveling device configured to cause the work machine to traverse a ground surface, and a parking brake configured to stop travel of the traveling device, the work machine being configured to work by cooperation between operation of the work equipment and the travel of the traveling device, the control system comprising:
   a controller configured to output a control command to control the parking brake based on at least a motion state of the work equipment with respect to the vehicle body, the motion state being detected based on a load or an angle of the work equipment with respect to the vehicle body.

2. The control system according to claim 1, further comprising:
   a work equipment operation device operable by an operator,

the controller being configured to output the control command based on at least an operation state of the work equipment operation device.

3. The control system according to claim 1, wherein the controller is configured to receive a signal indicating an operation state from the work equipment operation device, determine the operation state of the work equipment operation device based on the signal, and output the control command to control the parking brake to be in an engaged state or a disengaged state, at least when the controller determines that the work equipment operation device is in a non-operation state.

4. The control system according to claim 3, further comprising:

a vehicle speed adjustment device operable by the operator to adjust a vehicle speed of the work machine;

a vehicle speed sensor configured to detect the vehicle speed of the work machine; and a braking operation device operable by the operator to operate a braking device of the work machine, the controller being configured to receive a signal indicating an operation state from the vehicle speed adjustment device, receive a vehicle speed signal from the vehicle speed sensor, receive a signal indicating an operation state from the braking operation device, and output the control command to control the parking brake to be in the engaged state when the controller determines that the work equipment operation device is in the non-operation state, determines that the vehicle speed adjustment device is in a non-operation state, determines that the vehicle speed is lower than a predetermined threshold, and determines that the braking operation device is in the operation state.

5. The control system according to claim 1, further comprising:

a forward/rearward movement switching operation device operable by an operator to switch a traveling state of the work machine to a forward movement, neutral, or a rearward movement, the controller being configured to receive a signal indicating an operation state from the forward/rearward movement switching operation device, and output the control command when the controller determines that the forward/rearward movement switching operation device is in an operated state for the forward movement or the rearward movement.

6. The control system according to claim 1, further comprising:

a forward/rearward movement switching operation device operable by an operator to switch a traveling state of the work machine to a forward movement, neutral, or a rearward movement, the controller being configured to receive a signal indicating an operation state from the forward/rearward movement switching operation device, and output the control command when the controller determines that the forward/rearward movement switching operation device is in an operated state for the forward movement.

7. The control system according to claim 1, wherein the controller is configured to output the control command to control the parking brake to be in an engaged state when a holding function of the parking brake is set to be in an enabling state.

8. The control system according to claim 1, further comprising:

an operator presence detection sensor configured to detect whether or not an operator operating the work equipment is present, the controller being configured to receive a signal indicating a detection result from the operator presence detection sensor, and output the control command to control the parking brake to be in an engaged state when the controller determines that the presence of the operator is detected.

9. The control system according to claim 1, wherein the controller is further configured to output a second control command in order to interrupt power transmission to the traveling device when controlling the parking brake to be in an engaged state.

10. The control system according to claim 4, wherein the controller is configured to output the control command to control the parking brake to be in the disengaged state when the controller determines that the work equipment operation device is in the non-operation state, determines that the vehicle speed adjustment device is in the operation state, and determines that the braking operation device is in a non-operation state.

11. The control system according to claim 5, wherein the controller is configured to output the control command to control the parking brake to be in a disengaged state when the parking brake is controlled to be in an engaged state, and the forward/rearward movement switching operation device is operated for the rearward movement.

12. A control method for a work machine including a vehicle body, work equipment operated with respect to the vehicle body, a traveling device configured to cause the work machine to traverse a ground surface, and a parking brake configured to stop travel of the traveling device, the work machine being configured to work by cooperation between operation of the work equipment and the travel of the traveling device, the control method comprising:

outputting a control command to control the parking brake based on at least motion state of the work equipment with respect to the vehicle body, the motion state being detected based on a load or an angle of the work equipment with respect to the vehicle body.

13. The control method according to claim 12, wherein information indicating the operation state of the work equipment includes at least information indicating an operation state of a work equipment operation device operated by an operator to operate the work equipment, the control method further comprises:

receiving a signal indicating an operation state from the work equipment operation device;

determining the operation state of the work equipment operation device based on the signal;

receiving a signal indicating an operation state from a vehicle speed adjustment device operated by the operator to adjust a vehicle speed of the work machine;

receiving a vehicle speed signal from a vehicle speed sensor configured to detect the vehicle speed of the work machine; and receiving a signal indicating an operation state from a braking operation device operated by the operator to operate a braking device of the work machine, the control command is output to control the parking brake to be in an engaged state or a disengaged state when at least the work equipment operation device is determined to be in a non-operation state, and the control command is output to control the parking brake to be in the engaged state when the work equipment operation device is determined to be in the non-operation state, the vehicle speed adjustment device is determined to be in a non-operation state, the vehicle speed is determined to be lower than a predetermined threshold, and the braking operation device determined to be in an operation state.

14. The control method according to claim 12, wherein when a holding function of the parking brake is set to be in an enabling state, the control command is output to control the parking brake to be in an engaged state.

15. The control method according to claim 13, wherein the control command is output to control the parking brake to be in the disengaged state when the work equipment operation device is determined to be in the non-operation state, the vehicle speed adjustment device is determined to be in an operation state, and the braking operation device is determined to be in a non-operation state.

16. A work machine comprising:

a vehicle body:

work equipment operated with respect to the vehicle body;

a traveling device configured to cause the work machine to traverse a ground surface;

a parking brake configured to stop travel of the traveling device; and a controller configured to output a control command to control the parking brake based on at least a motion state of the work equipment with respect to the vehicle body, the motion state being detected based on a load or an angle of the work equipment with respect to the vehicle body, the work machine being configured to work by cooperation between operation of the work equipment and the travel of the traveling device.

17. The work machine according to claim 16, wherein information indicating the operation state of the work equipment includes at least information indicating an operation state of a work equipment operation device operated by an operator to operate the work equipment, and the controller is configured to receive a signal indicating an operation state from the work equipment operation device, determine the operation state of the work equipment operation device based on the signal, receive a signal indicating an operation state from a vehicle speed adjustment device operated by the operator to adjust a vehicle speed of the work machine, receive a vehicle speed signal from a vehicle speed sensor configured to detect the vehicle speed of the work machine, receive a signal indicating an operation state from a braking operation device operated by the operator to operate a braking device of the work machine;

output the control command to control the parking brake to be in an engaged state or a disengaged state when the controller determines that at least the work equipment operation device is in a non-operation state, and output the control command to control the parking brake to be in the engaged state when the controller determines that the work equipment operation device is in the non-operation state, determines that the vehicle speed adjustment device is in a non-operation state, determines that the vehicle speed is lower than a predetermined threshold, and determines that the braking operation device is in an operation state.

18. The work machine according to claim 16, wherein when a holding function of the parking brake is set to be in an enabling state, the control command is output to control the parking brake to be in an engaged state.

19. The work machine according to claim 17, wherein the control command is output to control the parking brake to be in the disengaged state when the work equipment operation device is determined to be in the non-operation state, the vehicle speed adjustment device is determines to be in an operation state, and the braking operation device is determined to be in a non-operation state.

* * * * *